United States Patent [19]

Hosaka et al.

[11] Patent Number: 4,882,778
[45] Date of Patent: Nov. 21, 1989

[54] ELECTRONIC LOAD DRIVE CONTROL APPARATUS

[75] Inventors: Masao Hosaka; Yoshitaka Ogino; Kazutoshi Shimada, all of Kanagawa; Takashi Saito, Chiba, all of Japan

[73] Assignee: Canon Kabushiki Kaisha, Tokyo, Japan

[21] Appl. No.: 318,469

[22] Filed: Feb. 27, 1989

Related U.S. Application Data

[63] Continuation of Ser. No. 225,667, Jul. 29, 1988, abandoned, which is a continuation of Ser. No. 695,720, Jan. 28, 1985, abandoned.

[30] Foreign Application Priority Data

Feb. 3, 1984 [JP] Japan .................................. 59-19174

[51] Int. Cl.[4] ...................... G06F 15/46; G05B 19/403
[52] U.S. Cl. ..................................... 364/187; 355/200; 364/184; 364/400
[58] Field of Search ............... 360/130, 400, 138, 139, 360/184–187; 318/310–313, 341, 329, 345 E, 599, 601, 603; 371/9; 355/14 C

[56] References Cited

U.S. PATENT DOCUMENTS

| | | | |
|---|---|---|---|
| 3,377,623 | 4/1968 | Revt et al. | 364/187 X |
| 4,262,336 | 4/1981 | Pritchard | 364/132 X |
| 4,298,832 | 11/1981 | Acker et al. | 318/341 |
| 4,332,461 | 6/1982 | Cail et al. | 355/8 X |
| 4,400,654 | 8/1983 | Elliott | 318/341 |
| 4,441,061 | 4/1984 | Yoshida | 318/341 |
| 4,491,004 | 1/1985 | Horiuchi et al. | 364/184 |
| 4,513,231 | 4/1985 | Kuno | 318/341 |
| 4,528,491 | 7/1985 | Takeuchi et al. | 318/603 |
| 4,599,545 | 7/1986 | Moriki | 318/341 |

*Primary Examiner*—Joseph Ruggiero
*Attorney, Agent, or Firm*—Fitzpatrick, Cella, Harper & Scinto

[57] ABSTRACT

There is disclosed a novel control system in an electronic apparatus such as a copier, in which intelligent registers are provided in addition to the microprocessor and execute control under predetermined conditions. The microprocessor interferes with the execution of control by the registers only when the conditions become aberrated from the predetermined value, and is therefore used for other tasks.

11 Claims, 17 Drawing Sheets

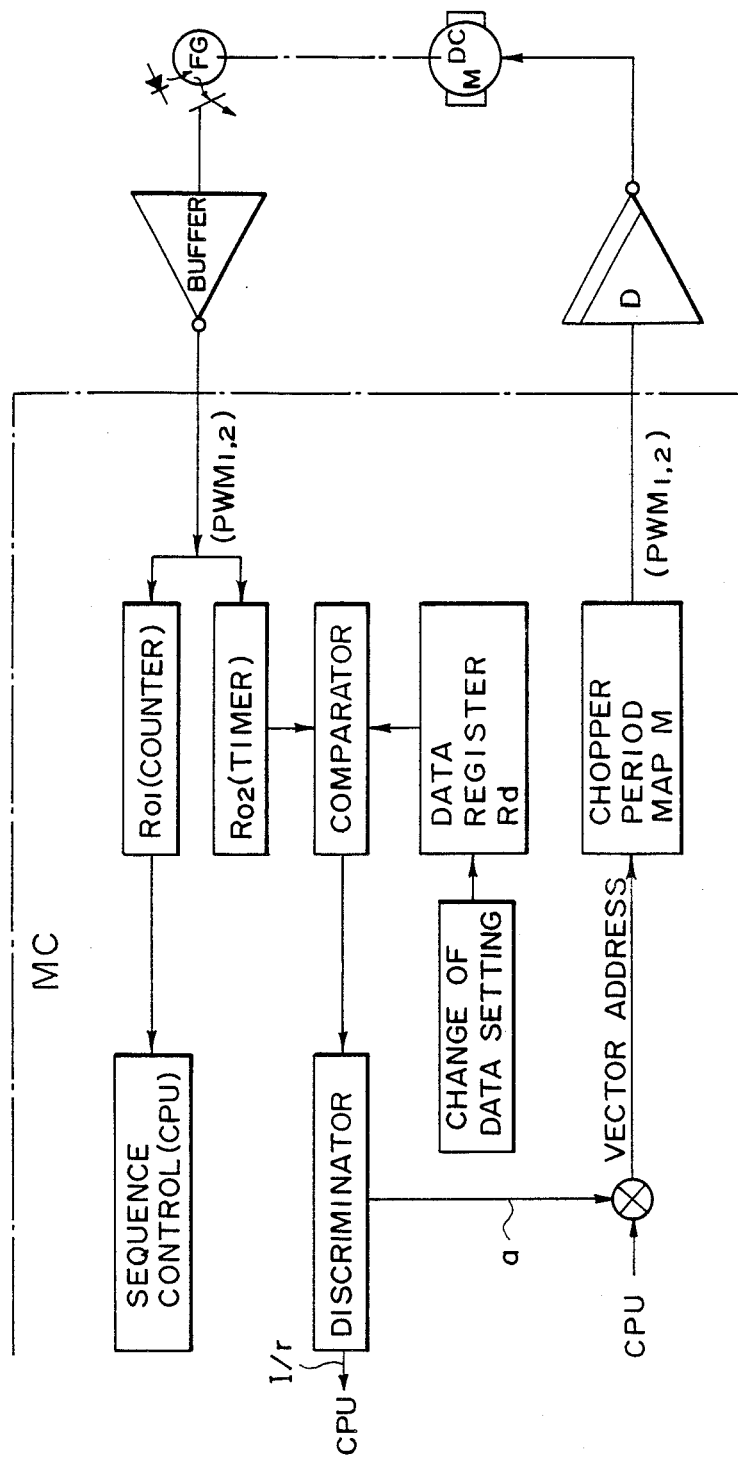
F I G. 6

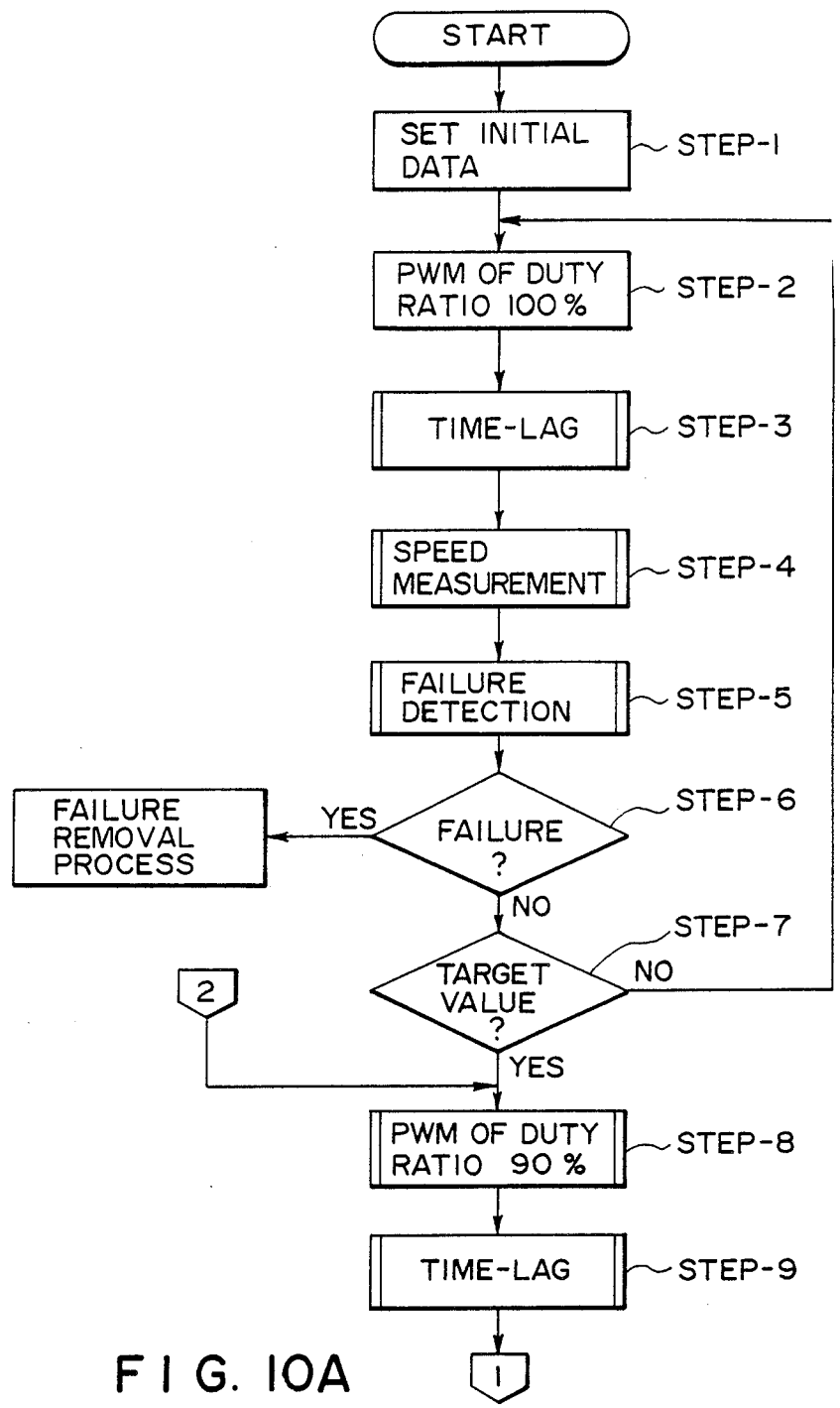
F I G. 10A

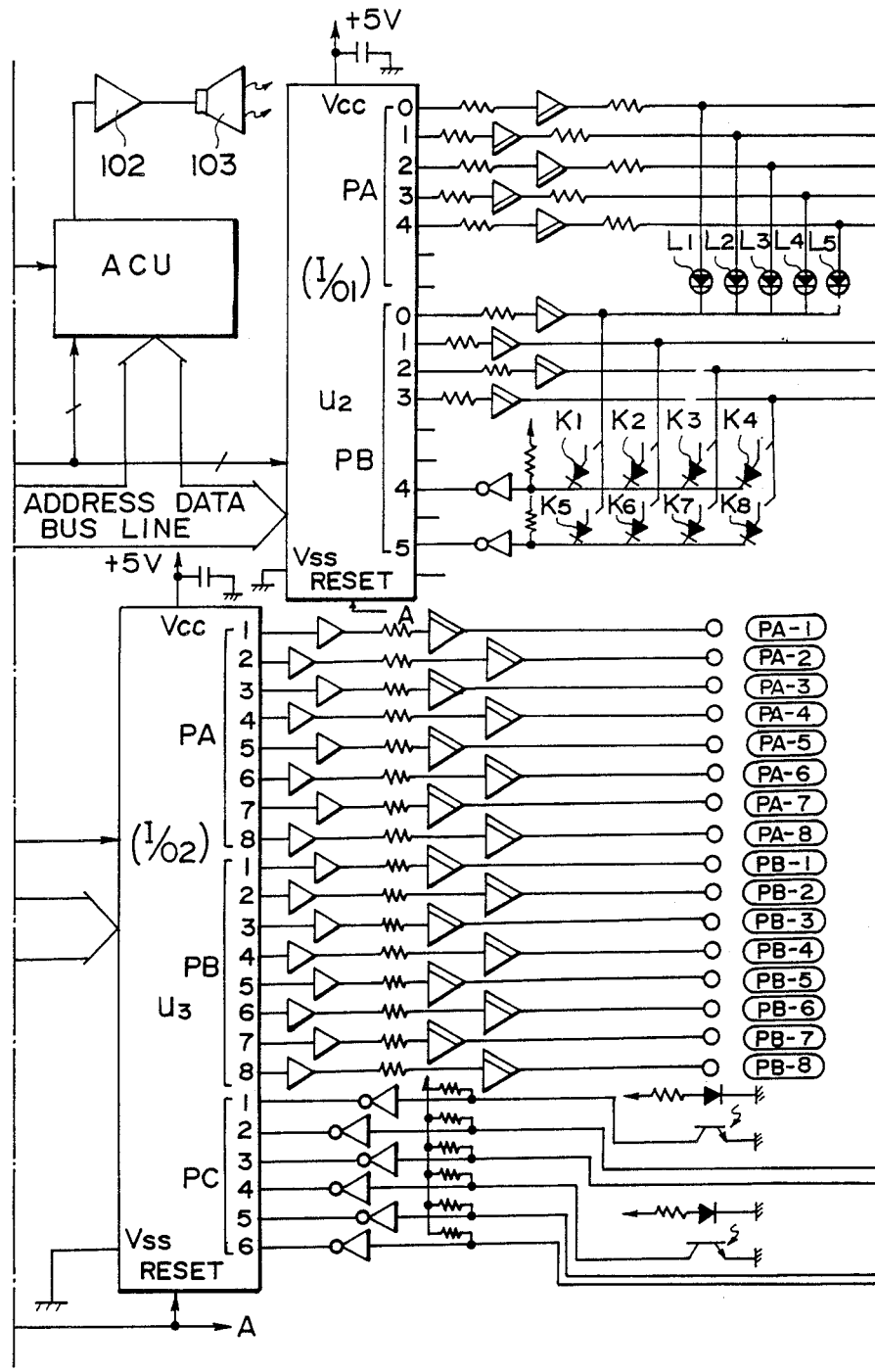
FIG. IIB

ELECTRONIC LOAD DRIVE CONTROL APPARATUS

This application is a continuation-in-part of application Ser. No. 225,667 filed July 29, 1988, abandoned which is a continuation of Ser. No. 695,720 filed Jan. 29, 1985 which is now abandoned.

BACKGROUND OF THE INVENTION

1. Field of the Invention

The present invention relates to an electronic apparatus controllable with a microcontroller.

2. Description of the Prior Art

In various electronic apparatus such as copier, the use of microcomputer for sequence timing control has become quite common because of excellent performance and flexibility in circuit control. However the microcomputer is principally employed for timing control so that, in the control of a copier, there are employed at least two microcomputers for the general sequence control and for the motor control.

FIG. 1 shows a copier as an example of the electronic apparatus in which the present invention is applicable. Said copier is provided with two motors respectively for main drive (photosensitive drum, sheet feeding, sheet transportation etc.) and for driving the optical system. The principal function of the copier is governed by said two DC motors, though the copier naturally contains other motors such as a cooling fan motor, a sheet transporting motor, and a fixing roller motor.

In the following there will be given an explanation on the structure of said copier, while making reference to FIG. 1. On a lateral end of the main body 21 of the copier there are provided two sheet cassettes 22, 23, and a sheet discharge tray 24 is provided on the other lateral end. Around a photosensitive drum 25 there are provided, as illustrated, a corona charger 46, an erasing lamp 47, an optical system 48, a developing roller 9, a transfer charger 10, a cleaning device 11 and a preexposure lamp 12. On the upper face of the main body 21 there is provided a glass plate 13, and an original document placed thereon is illuminated by an exposure lamp 14. The reflected light passes a lens system 15 and is guided to the aforementioned optical system 48. The sheets in the sheet cassettes 22, 23 are guided by feed rollers 16, 17 to registration rollers 18, and, after the transfer of a toner image from said photosensitive drum 25 by means of the aforementioned transfer charger 10; the sheet is transported by a conveyor belt 19 to fixing rollers 20 and is finally discharged to the tray 24.

A main motor 1 for driving the drum, transporting system, fixing system and other mechanical parts other than the optical system is composed of a DC servo motor for obtaining a constant speed. An optical system driving motor 2 is composed of a DC servo motor. A suction motor 3, composed similarly of a DC motor, is used for adhering the sheet onto the conveyor belt 19 to carry the sheet to a fixing station. In the present apparatus all the driving motors are composed of DC motors for avoiding the trouble of change in the gear ratio change associated with the change in the power supply frequency 50 Hz or 60 Hz. The use of DC motors, which are smaller in size and higher in the output torque than AC motors, has become quite common in motor-controlled electronic apparatus.

Now there will be explained the function of the above-described apparatus. When the power supply is turned on, there is conducted initialization of the photosensitive drum by cleaning thereof and by removal of the surface potential by the preexposure lamp, thus obtaining a uniform surface potential. When a heater in the fixing station 20 reaches a predetermined temperature, a display indicating the operable state is given in an unrepresented operation unit. In this state the operator selects the sheet size and the copy number, and depresses a copy start button. Upon depression of said copy start button, a sheet of the selected size is supplied from the cassette 22 or 23 and reaches the registration rollers 18 to align the front end. In the meantime the sheet size is detected by counting the sheet running time, for example, with reflective photosensors arranged according to the sheet sizes, in order to effect the blank exposures on the leading, trailing and lateral ends of the photosensitive member according to thus obtained sheet size thereby avoiding deposition of toner outside the image area. Also in the course of the scanning motion of the optical system, the density and the size of the original are read by unrepresented photodiodes and are fed back on real time basis for illumination and bias control to automatically control the copy density. Said feed back is made to an unrepresented developing bias control circuit to regulate the developing bias, thus automatically optimizing the image density.

On the other hand the original scanning optical system is controlled by a servo motor and scans the original with a doubled speed for a full length or a half length according to the data of sheet size detection.

Subsequently to the image formation explained above, the sheet which have received the transferred image is subjected to image fixation in the fixing station 20 and is discharged to the tray 24.

In the following there will be explained an example of the control of speed and position of the motors employed in the copier. FIG. 2 shows the principle of the phase locked loop (PLL) system employed in the servo control. A signal $f_{LO}$ from a reference oscillator $V_{CO}$ and a reference frequency signal $f_R$ are supplied to a phase comparator, and an error voltage $V_E$ is supplied back to the oscillator $V_{CO}$ through a low-pass filter LPF for eliminating the high frequency components. The error voltage $V_E$ is not generated when the phases of $f_V$ and $f_R$ are mutually equal. If $f_V$ and $f_R$ are different, an error voltage $V_E$ is generated to vary the oscillation frequency $f_{VO}$ of the oscillator $V_{CO}$. Said variation continues until the error voltage becomes zero, namely until the phases of $f_V$ and $f_R$ become mutually equal.

FIG. 3 shows an example of motor servo control utilizing the above-described principle. The control system is composed, as shown in FIG. 3, of a phase comparator, a low-pass filter LPF, an amplifier AMP, a motor M and an encoder ENC. The phase comparator compares a command signal $S_1$ with a feedback signal $S_2$ to generate an error signal. In case the command signal $S_1$ and the feedback signal $S_2$ are composed of continuous AC signals, the output of the phase comparator is given by:

$$V_c = K_m S_1 S_2 \quad (1)$$

The AC command signal $S_1$ can be represented by:

$$S_1 = -V_s \cos\theta_i.$$

The angle $\theta_m$ of the motor shaft is related to the electric angle $\theta_o$ of the encoder ENC by $\theta_o = n\theta_m$, wherein n represents the number of pulses generated by the rotation of the encoder. On the other hand, the feedback signal $S_2$ is represented by:

$$S_2 = V_0 \sin\theta_o$$

so that the output of the phase comparator in (1) can be rewritten as:

$$V_c = -K_m V_s V_o \cos\theta_i \sin\theta_o \quad (2)$$

which is further modified as:

$$V_c = K_m V_s V_o /2 [\sin(\theta_i - \theta_o) - \sin(\theta_i + \theta_o)] \quad (3)$$

Since $\sin(\theta_i + \theta_o)$ is a high-frequency component and is cut off by the low-pass filter LPF, the equation (3) becomes $V_c = K_p \sin(-\theta_i + \theta_o)$ wherein $K_p = K_m V_s V_o / 2$. Also the phase difference $\theta_e$ is given by:

$$\theta_e = \theta_i - \theta_o$$

so that the equation (3) can be approximated as:
$V_c = K_p(\theta_i - \theta_o) = K_p \theta_e$
thus giving rise to a simplified model as shown in FIG. 3. The output of the phase comparator can therefore be approximated as the sum of two components.

Now reference is made to FIG. 4 showing an example of circuit utilizing the above-explained principle The microcomputer employed is a multiprocessor system involving two microprocessors MPU1, MPU2 composed of Intel 8051's, of which MPU2 for motor control alone is illustrated. For speed and position control, the servo motor generally requires constant counting of pulses from the encoder. Consequently, the use for this purpose of a common microprocessor which is also used for sequence control is inadequate for real-time control and may give rise to an erroneous operation. Consequently there are employed two microcomputers, of which unrepresented one MPU1 is used for sequence control while the other one MPU2 controls the main motor DCM1 and the optical scanning motor DCM2 through optical encoders OPE1, OPE2. The MPU1 and MPU2 are mutually synchronized through a serial communication interface and achieve mutual interfacing through bit-pattern protocol. The MPU1 will be further explained later.

In FIG. 4, timing pulses are generated by a rotating disk fixed on the shaft of the main motor DCM1 and are supplied to an event counter. Said pulses have a determined ratio, for example 1/10, to pulses generated by a frequency generator FG for servo control fixed on the shaft end of the main motor and generating for example ca. 200 pulse per turn of the motor.

As explained in the foregoing, a multi-chip structure has been indispensable for real-time control of a copier, and such multi-chip structure has been inevitably complex because of the required interfacing between the MPU's.

In addition, such structure inevitably require LSI's for servo control, and analog IC's such as D/A converter, F/V converter, comparator etc., which raise the cost of the entire system. Also the complicated control circuit requires a prolonged time in designing and debugging, reduces the reliability of the system and requires an increased space.

SUMMARY OF THE INVENTION

An object of the present invention is to provide an electronic apparatus not associated with the above-explained drawbacks.

Another object of the present invention is to provide an electronic apparatus provided with an improved one chip controller.

Still another object of the present invention is to provide an electronic apparatus which is simplified in the control unit, program design and structure and is rendered smaller in dimension through the use of an intelligent microcontroller.

Still another object of the present invention is to provide a microcontroller which allows to simplify the control unit of an electronic apparatus, enable a hardware-oriented structure and significantly reduce the time required for program construction, designing and debugging.

Still another object of the present invention is to provide a microcontroller capable of automatic control on hardware, without the use of a program, once a control range is set in a data area by a program.

Still another object of the present invention is to provide a microcontroller which transmits the information by an interruption procedure to a microcomputer only when a control tolerance range is exceeded.

Still another object of the present invention is to provide a one-chip controller enabling, in the control of an object, the microcomputer to exclusively perform other tasks.

Still another object of the present invention is to provide an electronic apparatus capable of highly advanced one-chip control by a microcontroller even when the number of systems to be controlled increases.

Still another object of the present invention is to provide an electronic apparatus allowing control through a simple program structure, without the use of plural microcomputers, IC's or LSI's therefor, separate encoders for timing control and monitor program.

BRIEF DESCRIPTION OF THE DRAWINGS

FIG. 6 is a block diagram of an electronic apparatus of the present invention;

FIGS. 10A, 10B and 10C are flow charts showing a speed control procedure for a main DC motor;

FIGS. 11, 11A, 11B, and 11C comprise is a circuit diagram showing a circuit structure employing a microcontroller of the present invention;

DETAILED DESCRIPTION OF THE PREFERRED EMBODIMENTS

Figure 5:
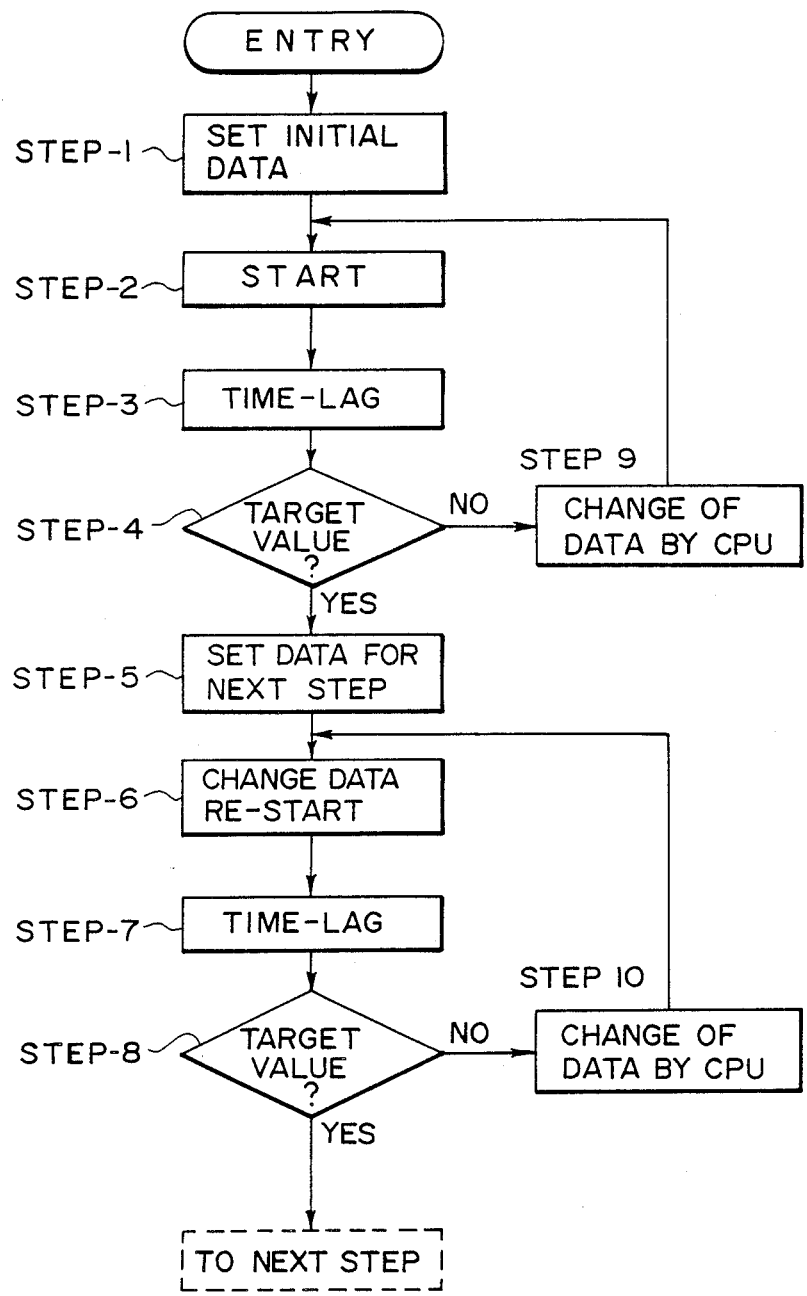
FIG. 5 is a flow chart showing the automatic control procedure according to the present invention.

Now the present invention will be clarified in detail by embodiments thereof shown in the attached drawings and illustrating an example of control system employing a novel intelligent microcontroller MC with incorporated automatic control function and capable of facilitating the servo control. In said control system there are provided a certain number of intelligent registers not existent in the conventional microcomputer, whereby the data processing and command execution are achieved by hardware function of said registers without the use of CPU under the predetermined conditions, and a change in said conditions is requested, for example, by an interruption procedure of the CPU only when said conditions are exceeded by a determined amount. Consequently the CPU can be used exclusively for other tasks during said control, and a multi-task processing is rendered possible by the use of such microcontroller. FIG. 6 shows the circuit of such microcontroller, and FIG. 5 shows a flow chart of the above-described function in case of control toward a target value under preset data. Said flow chart will be stepwise explained in the following:

STEP-1: The CPU sets, in a data register Rd, initial data including a control range, an upper limit and a lower limit between which the control by a hardware function to be explained latter is to be conducted.

STEP-2: Control is initiated with the values set in said STEP-1:

STEP-3: There is given a certain time lag which is also set at the initialization in the STEP-1:

STEP-4: Discrimination is made after a determined time as to whether the target value is reached, and, if not, a signal is given to the CPU for a data change in the STEP-9. This corresponds to a case in which the value obtained after a determined time from the STEP-1 is in the defined range, and there is set a flag indicating that said value exceeds the upper limit or is below the lower limit, thus providing an interruption signal I/r to the CPU:

STEP-5: Control proceeds to a next phase to automatically set next data, without the intervention of the CPU:

STEP-6: Data of the data register Rd are changed to next target for restarting the control procedure. The restarting indicates a part of continuous process with modified data, and does not include any interruption in the procedure:

STEP-7: There is given a determined time lag:

STEP-8: Discrimination is made as to whether the second target value is reached, namely whether the obtained value lies in the target range. If not, a flag indicating that the obtained value is above the upper limit or below the lower limit is set to call the CPU as in the STEP-4, and a new data change is effected in the STEP-10.

As explained in the foregoing, the CPU is called only in the STEP 9 or 10, and the control is automatically effected by the hardware in the remaining part of the procedure.

Figure 7:
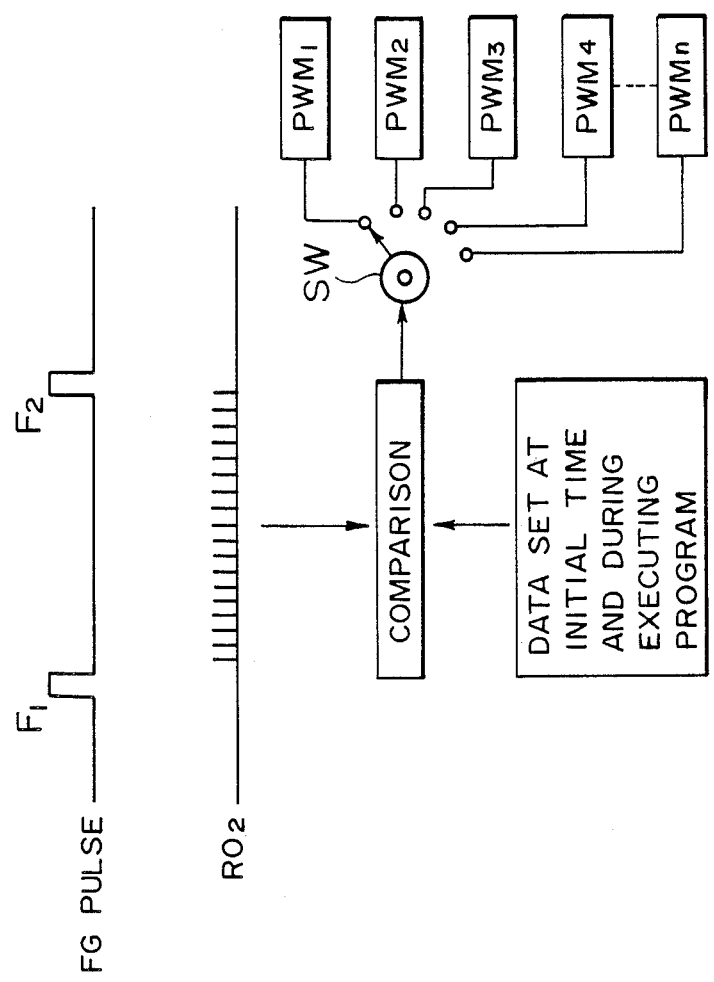
FIG. 7 is a block diagram showing the principle of motor speed control.

Now there will be given an explanation on an electronic apparatus utilizing the microcontroller MC, based on the aforementioned principle of motor servo control and on the function shown in FIG. 5. FIG. 6 is a schematic block diagram of said electronic apparatus. Outside the microcontroller MC there are only provided a driver D, a motor with a frequency generator FG, and a wave-forming buffer. Pulses generated from the frequency generator FG as the result of motor rotation are supplied to a counter R01 and a timer R02 in the microcontroller MC. The counter R01 for position control is composed of a register for simply counting the entered pulses. The CPU performs timing control such as stopping the motor M by means of said count. The timer R02 measures the time between the entered pulses. The data register Rd stores data entered at the initialization of the microcontroller MC, and said data may be recalled at any time from a program memory ROM. New data setting is effected by program execution of CPU. At the stepwise speed increase after the motor is started, the data in the register Rd are changed by program, without the use of CPU. The value measured in the timer R02 is compared in the comparator C with data in the data register, and, if both mutually coincide with a predetermined range, a corresponding vector address (corresponding to SW shown in FIG. 7) is set in a discriminator DC to select a chopping value (pulse width modulation (PWM) value) from a chopper period map M, thus achieving the speed control of the motor through a without the function of CPU. This principle is shown in FIG. 7. When a data range is exceeded, the discriminator supplies an interruption signal I/r to the CPU, which interrupts the program execution and executes a program for releasing a corrected vector address.

In FIG. 7, the interval between the pulses F1, F2 (to be counted by R01) from the frequency generator FG is measured by the counting of finer pulses with R02 and is compared in succession with data, and in case it coincides with the latter or falls within a determined range thereof, the PWM value is selected by a vector address, which is represented by a selector switch SW in FIG. 7. The PWM value remains unchanged if the obtained count is same as the proceeding one. It is therefore possible to maintain a constant motor speed, or to increase or decrease the motor speed when required, by inspecting the interval of the pulses from the frequency generator FG-by means of the register R02.

Figure 8:
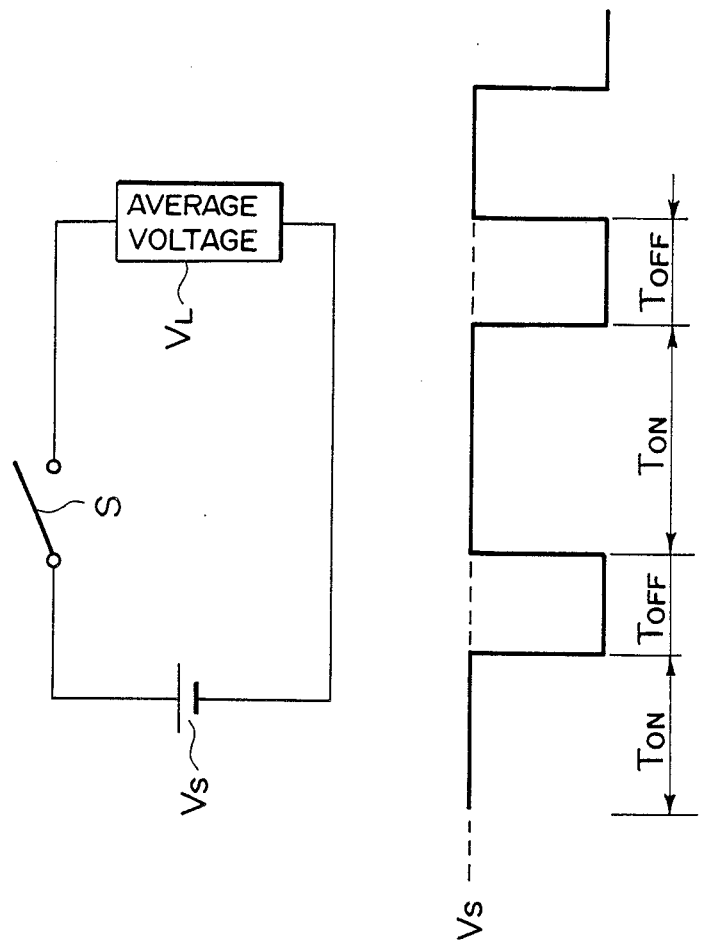
FIG. 8 is a schematic view showing the principle of speed control of a DC motor by chopping

Now reference is made to FIG. 8, schematically showing the principle of speed control of a DC motor by chopping method. In FIG. 8, a switch S is repeatedly turned on for a period $T_{on}$ (seconds) and turned off for a period $T_{off}$ (seconds). In this state, the average voltage $V_L$ on the load is:

$$V_L = T_{on}/T_{on} + T_{off} V_s = T_{on}/T \cdot V_s$$

so that the voltage on the load can be controlled by regulating the time ratio $T_{on}/T$. By substitution $T_{on}/T = a$, $V_L$ is represented by $a \cdot V_s$. The value $a$, called duty ratio, may be varied by a change in $T_{on}$ while T is maintained constant to obtain a DC voltage of an arbitrary magnitude from a DC voltage of a determined value. Such voltage control is called time ratio control.

In FIG. 6 showing an embodiment of the present invention, the system is solely composed of a one-chip microcontroller MC, a driver D consisting of a transistor chopper, a DC motor, an encoder FG and a buffer for forming the signal shape of the pulses from FG The system is therefore extremely simple, requires only a small area and provides a high reliability due to the absence of externally attached component parts.

Figure 9A:
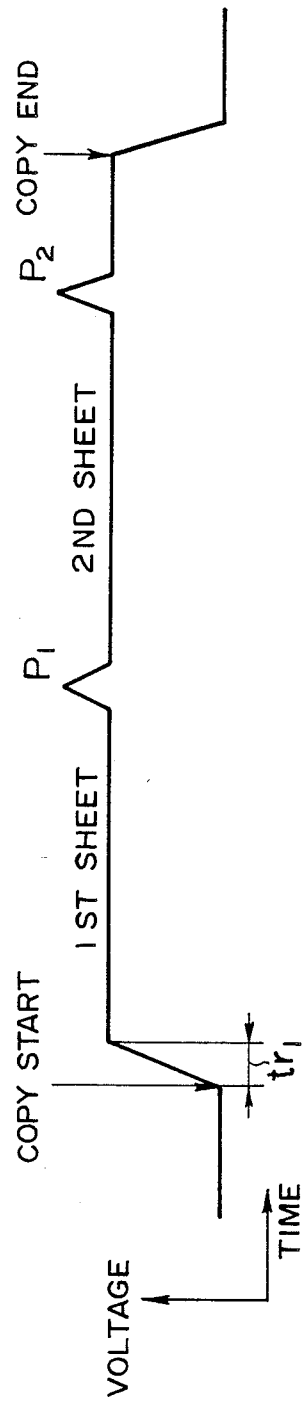
FIGS. 9A and 9B are timing charts showing the function of a motor driving system.
Figure 9B:
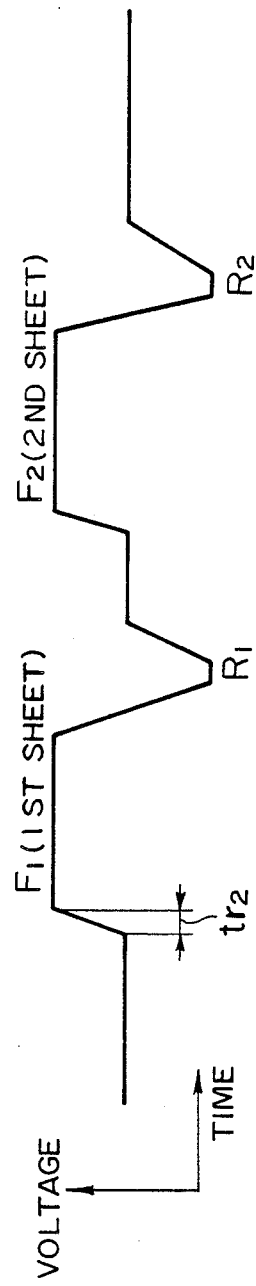

Now there will be explained a motor driving system for use in a copier, as an example of the above-described system. FIGS. 9A and 9B are timing charts showing the function of said system. The copier in this example is provided with two motors respectively for (a) driving drum and (b) driving optical scanner.

When the copy start button is turned on, the voltage of a PWM value with a duty ratio of 100% is supplied to activate the drum driving motor (a) within a determined time lag. As the revolution approaches the target value, the data in the microcontroller MC are renewed to gradually reduce the duty ratio.

The motor is so designed as to reach the rated revolution under a constant load, with a duty ratio of 50-60%. The status and load of the motor can be judged by the measurement of pulse interval with the register R02 as explained before.

In FIG. 9A, P1 indicates a transitional torque when the transported sheet is pinched between the fixing rollers. A fluctuation in the revolution can however be prevented by a temporary increase in the duty ratio in advance at a timing predicted from the pulse number counted by the counter R01. Also the fixing rollers themselves may be driven by a DC motor.

FIGS. 9A and 9B show an example of making two copies, in which the optical scanner motor is likewise activated within a time lag Tr2 as represented in FIG. 9B. The motor rotates in the forward direction for advancing the optical system at a timing F1. Then the motor is reversed at a timing R1 to return the optical system in the first copying operation. In the course of said reverse rotation the optical system is stopped at the home position under braking without shock in order to avoid mechanical vibration which may affect the image formation in the next scanning.

As explained in the foregoing example of copier, the speed, positional and sequence control for synchronization of two motors can be achieved by the counter R01 of the microcontroller MC, through the use of pulses of the frequency generator FG directly linked with the motor, without any particular encoders. In the following there will be explained a control flow for speed control, particularly for constant speed control, of the main motor of the present invention, while making reference to Figs. 10A, 10B and 10C.

The stepwise function of said control flow is as follows:

STEP-1: PWM data are set in the data register to reach a constant speed within a determined time. At the start, the duty ratio is set at 100% for full load:

STEP-2: A full power is supplied with a PWM value corresponding to a duty ratio of 100%:

STEP-3: A determined time lag is given:

STEP-4: The speed is measured by counting with the register R02:

STEP-5: Diagnosis is effected to detect an abnormality. For example, if the target speed is not reached within a determined time in the STEPs 1 to 6, there may be an abnormally high load on the motor or a slippage of the motor shaft:

STEP-6: Discrimination is made as to whether an abnormality has been found, an abnormality procedure is executed for an abnormality or the power supply is cut off for a serious abnormality. Upon discrimination of an abnormality by the discriminator D, it may handle said abnormality by itself or may inform the CPU of said abnormality for handling by the CPU:

STEP-7: A discrimination is made as to whether the target speed has been reached. If reached, the PWM value is regulated to reduce the duty ratio. If the target speed is not reached, an interruption signal is given to the CPU in the same manner as in the STEP-4 in FIG. 5 for making correction:

STEP-8-30: The target speed is rapidly reached by stepping down of the PWM value. The purpose of duty ratio step-down is to achieve smooth arrival at the target speed and to prevent an overshoot phenomenon (fine vibration in speed caused by a speed exceeding the target value, followed by excessive feedbacks toward the target value):

STEP-31: A discrimination is made as to whether the target speed has been reached:

STEP-32: When the target speed is reached, the duty ratio is adjusted to 50%:

STEP-33: Speed is measured by pulse counting to identify whether it is slower or faster than the target value, for setting the PWM duty ratio:

STEP-34: Diagnosis of abnormality is effected:

STEP-35: Position information is tested by the count of the register R01 and the timing of the sequence control:

STEP-36: Result of abnormality diagnosis in the STEP-34 is discriminated:

STEP-37: Discrimination is made, by the positional information from the STEP-35, as to whether a position is reached where an increase in the load torque due to the arrival of a sheet in the fixing station in case of a copier. If said position is not reached, the program jumps to the STEP-31 to repeat the constant speed control:

STEP-38: The duty ratio is raised to 60-100% according to the estimation in order to prevent a speed drop at a position where the load is significantly increased.

STEP-39, 40: Speed measurement is effected after a determined time to discriminate whether the speed is aberrated from the target value due to a change in the load:

STEP-41: A stop signal is checked. If the control is completed, the power supply to the motor is shut off.

In the foregoing explanation of the flow chart shown in FIG. 10, a conventional von Neumann computer has been taken as an example for the ease of understanding, but the present invention is by no means limited to such embodiment.

As shown in FIG. 6, once a control range (a target value $\pm a\%$) is set in a data area by the CPU, the microcontroller MC can perform automatic control by hardware in said range of $a\%$ without the involvement of program and can supply an interruption signal to the CPU, when said range is exceeded, to advise whether said range is exceeded at the upper or lower limit. In this manner the CPU can be exclusively used for other tasks Since such control of speed and position can be achieved automatically, such microcontroller enables highly advanced control even when the number of motors increases.

Figure 1:
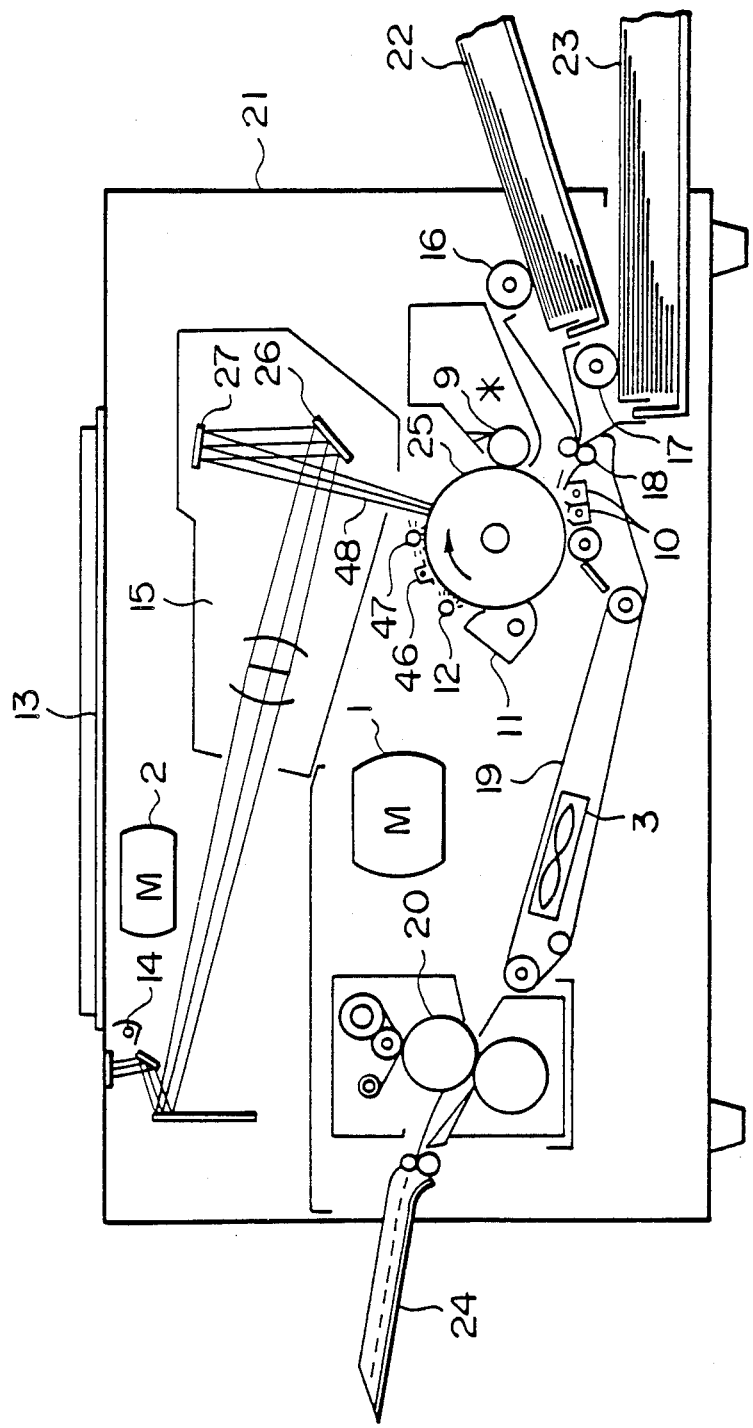
FIG. 1 is a cross-sectional view of a copier in which the present invention is applicable.
Figure 2:
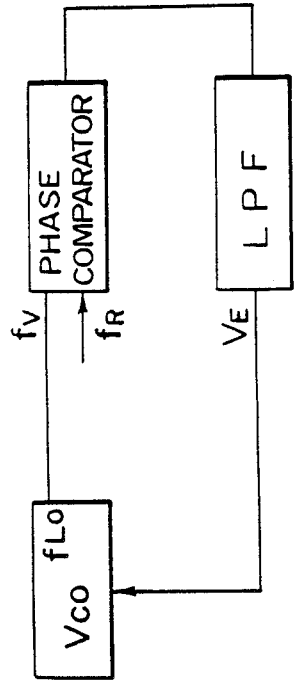
FIG. 2 is a chart showing the principle of phase locked loop system employed in servo control.
Figure 3:
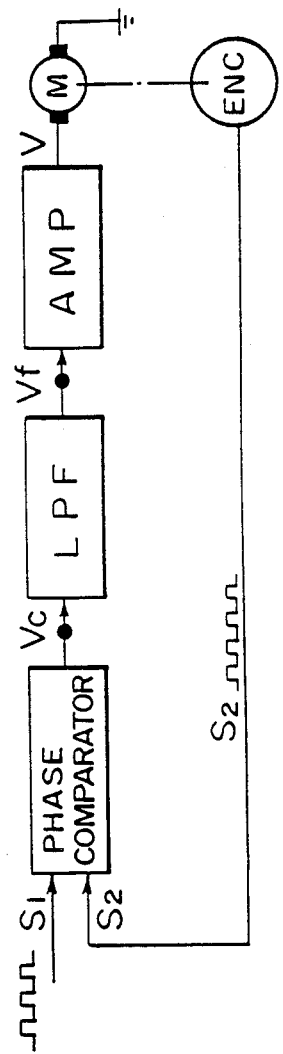
FIG. 3 is a block diagram of a motor servo control utilizing the principle shown in FIG. 2.
Figure 4:
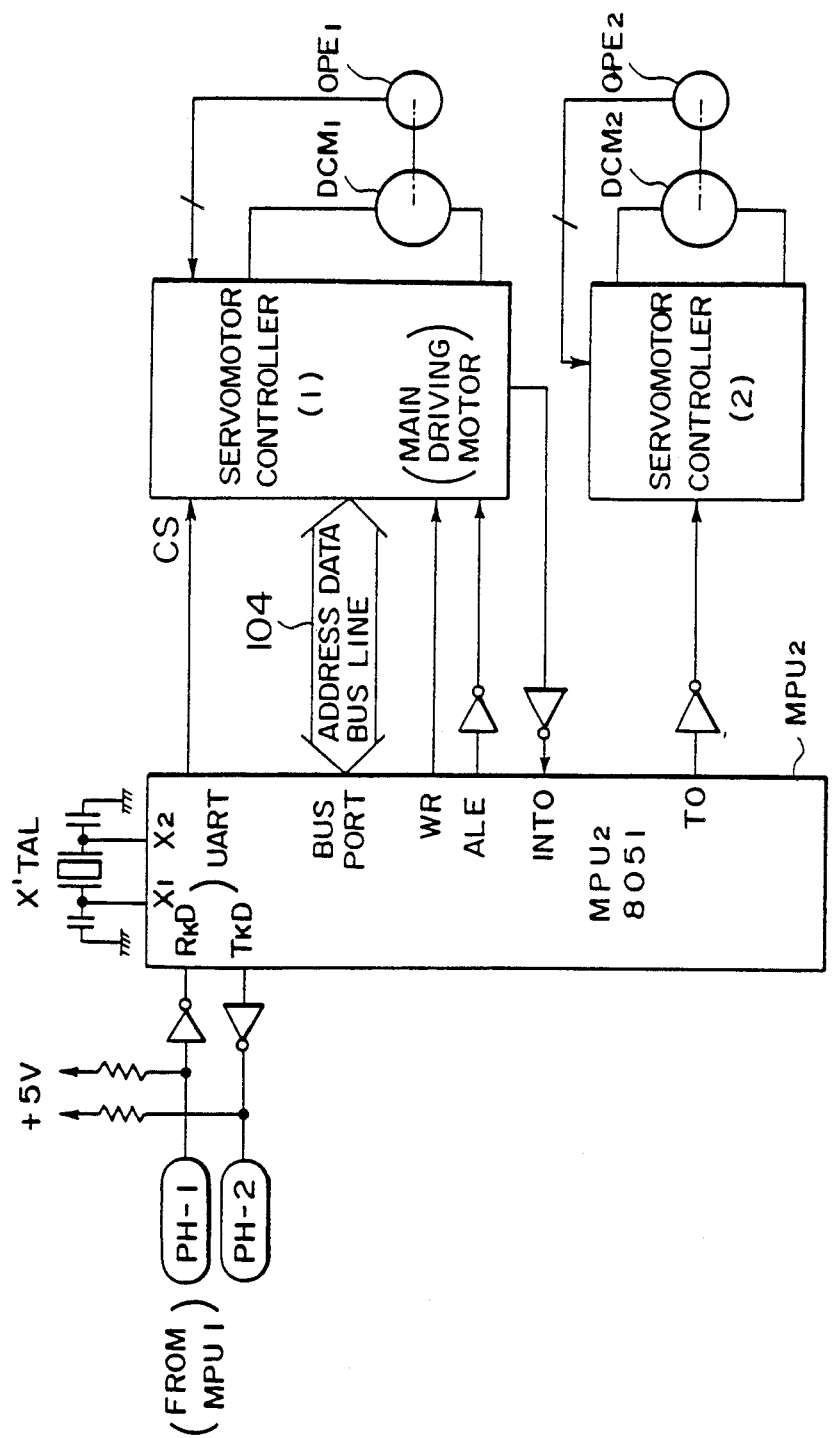
FIG. 4 is a block diagram showing a conventional control, circuit.
Figure 11A:
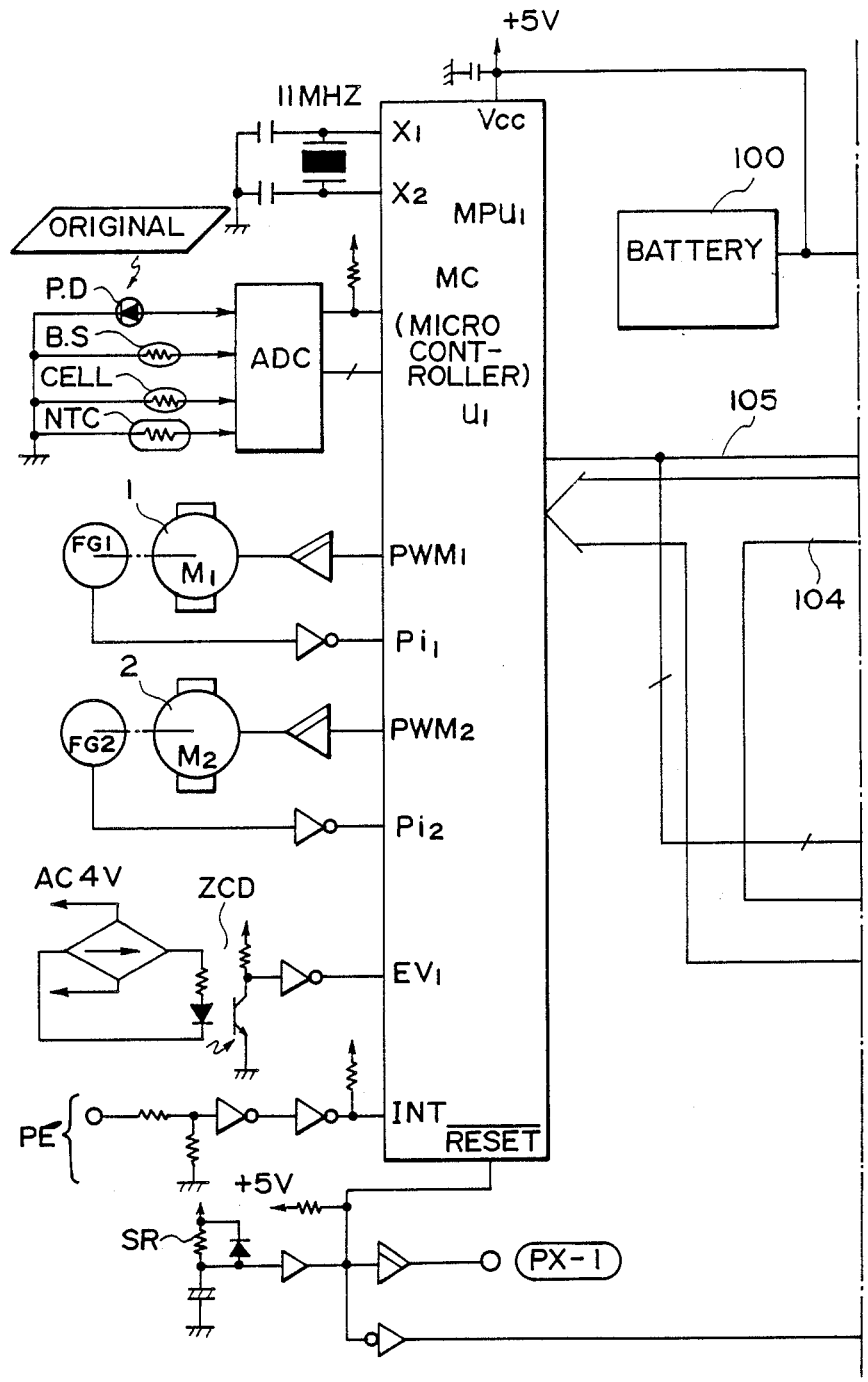
Figure 11:
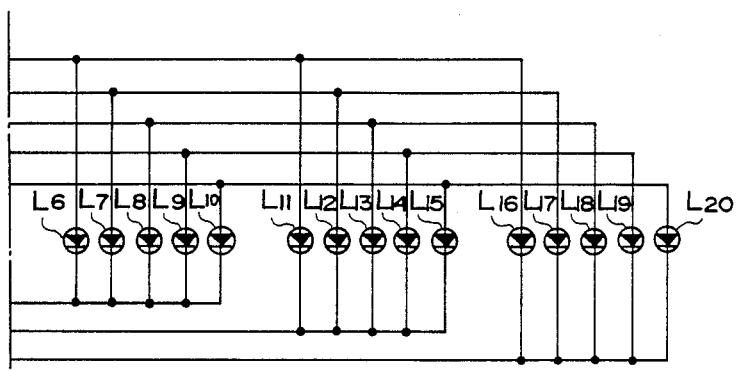
Figure 11:
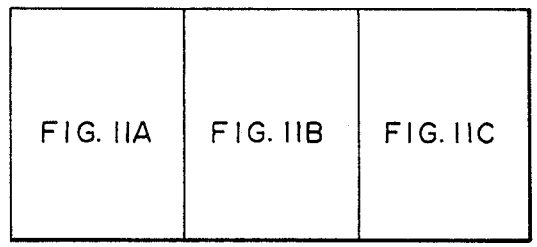
Figure 11C:
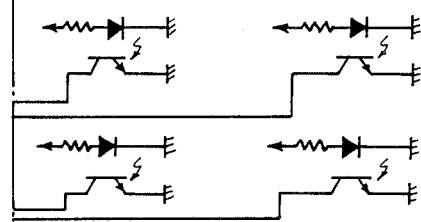

FIG. 11 shows an example of the circuit employing the microcontroller of the present invention. Said circuit constitutes a control device for copier, composed of 4 chips, i.e. a microcontroller MPU1 (U1), I/O expansion elements U2, U3 and an acoustic synthesizer ACU. From the comparison with the conventional circuit shown in FIG. 4, it will be understood that only one microcontroller is employed Intelligent I/O ports PWM1, PWM2, as shown in FIG. 6, of the microcontroller MCU1 are used for driving two DC motors, i.e. a main motor Ml(1) and an optical scanner motor M2(2). A frequency generator FG1 of the main motor Ml generates pulses Pi1, and there are provided two registers respectively for counting said pulses to effect sequence control, and for measuring the pulse interval to effect servo control Another frequency generator FG2 of the optical scanner motor generates pulses Pi2, which are likewise used for the detection of speed and position by means of two registers. Consequently the MPU2 shown in FIG. 4 can be dispensed with. Also the encoder (not shown in FIG. 4) for generating timing clock pulses for the entire sequence control can be eliminated. The encoder pulse count for timing control is entered into a port Pi1 of the microcontroller U1. The register structure of Pi1, Pi2 is same as shown in FIG. 6, and output ports PWM1, PWM2 are also same as shown in FIG. 6. Consequently the servo control for motor is effected by the registers of the I/O port of the microcontroller without the involvement of program, so that the CPU can be exclusively used for other sequence control. In a copier with realtime data processing, therefore, there is obtained a significant improvement in reliability, cost and space as the use of plural microcomputers exclusive for automatic control can be avoided. The controller shown in FIG. 11 is designed for a medium-speed copier (20-30 copies/minute). I/O expansion elements are provided for increasing the number of I/O ports but a microcontroller will naturally be sufficient for a smaller system. A 4-channel A/DC performs analog data acquisition for temperature control (NTC), detection of the original density (PD), body sensing (BS) by detection of infrared rays from a human body to activate the acoustic synthesizer, and light level detection (CELL) for lamp regulation, thereby effecting feedbacks for automatic control systems There are also shown a zero-cross detector ZCD; a power fail detecting circuit PF to supply an interruption signal to a port INT of the microcontroller in response to a failure in power supply to retain the data; a system resetting circuit SR for resetting RAM etc. at the start of power supply, connected the resetting ports of the microcontroller MC(U1), DC power relay (PX-1) and I/O expansion elements U1, U2; a battery power supply 100 for memory back-up; an acoustic synthesizer 101 (ACU) for informing the abnormality of the apparatus through an amplifier 102 and a speaker 103; an address data busline 104; and a control line 105.

The I/O expansion element U2 is principally used for controlling an operation/display unit, keys and indicator lamps, wherein ports PA are used for controlling display LED's L1-L5 for indicating the functional state, L6-L10 for indicating the density and L11-L20 for copy number counter, and ports PB are used for controlling the entries from semiconductor diode keys K1-K8 (a copy start key Kl, a clear/ stop key K2, a counter up key K3, a counter down key K4, a density adjusting key K5, an automatic mode key K6, a manual mode key K7 and a diagnosis guide key K8 for diagnosing the status of apparatus).

The I/O expansion element U3 is used for sequence control as an expansion of the I/O ports of the microcontroller MC, wherein ports PA-1 - PA-8 are respectively used for controlling the pre-exposure lamp, sheet feeding clutch, registration clutch, stepping motor for moving the magnification-regulating lens, cleaner, used toner conveying motor, high- (voltage power source, power relay and heater. Also the ports PB include a port PB-1 for lamp control, ports PB-2-PB-4 for erasing lamp control, ports PB-5-PB-7 for developing bias control, and a port PB-8 for buzzer control. Also the ports PC-1-PC-6 are used respectively for detecting the remaining toner, recovered toner, original document, sheets in the cassette, jamming of the copy sheet, and discharge of the copy sheet.

Figure 12A:
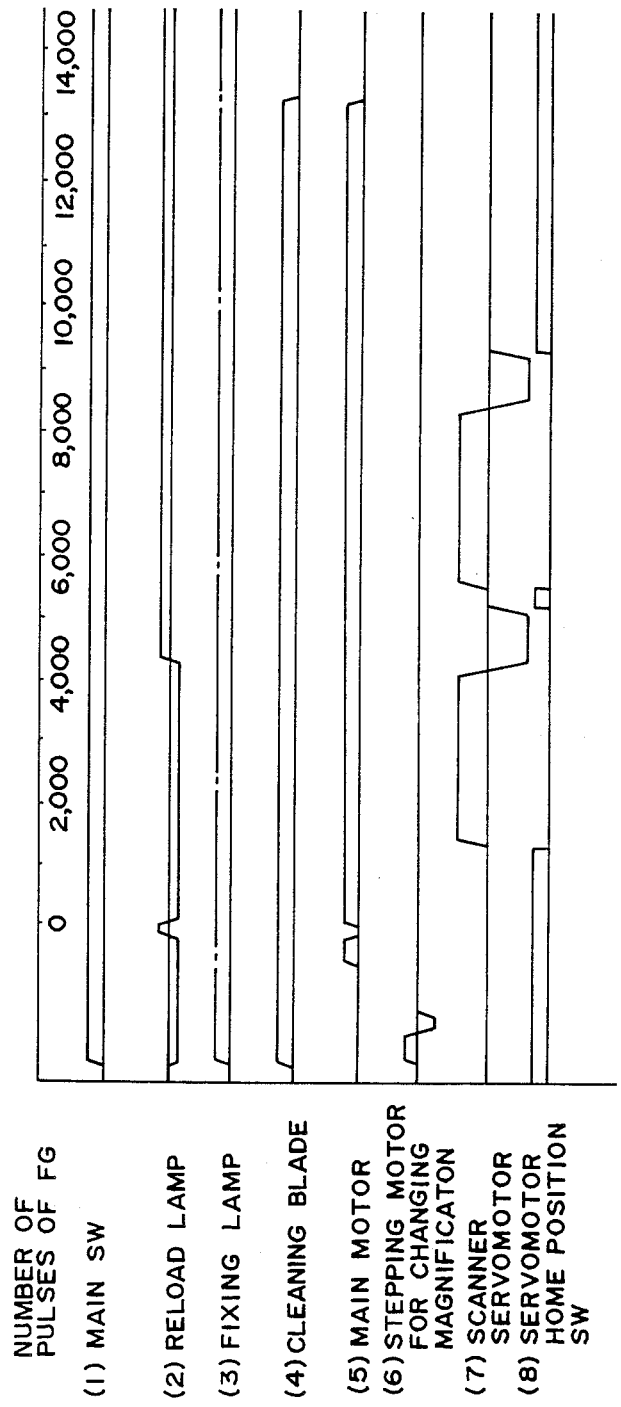
FIGS. 12A and 12B are timing charts showing a control procedure in a same-size copying operation of the copier.
Figure 12B:
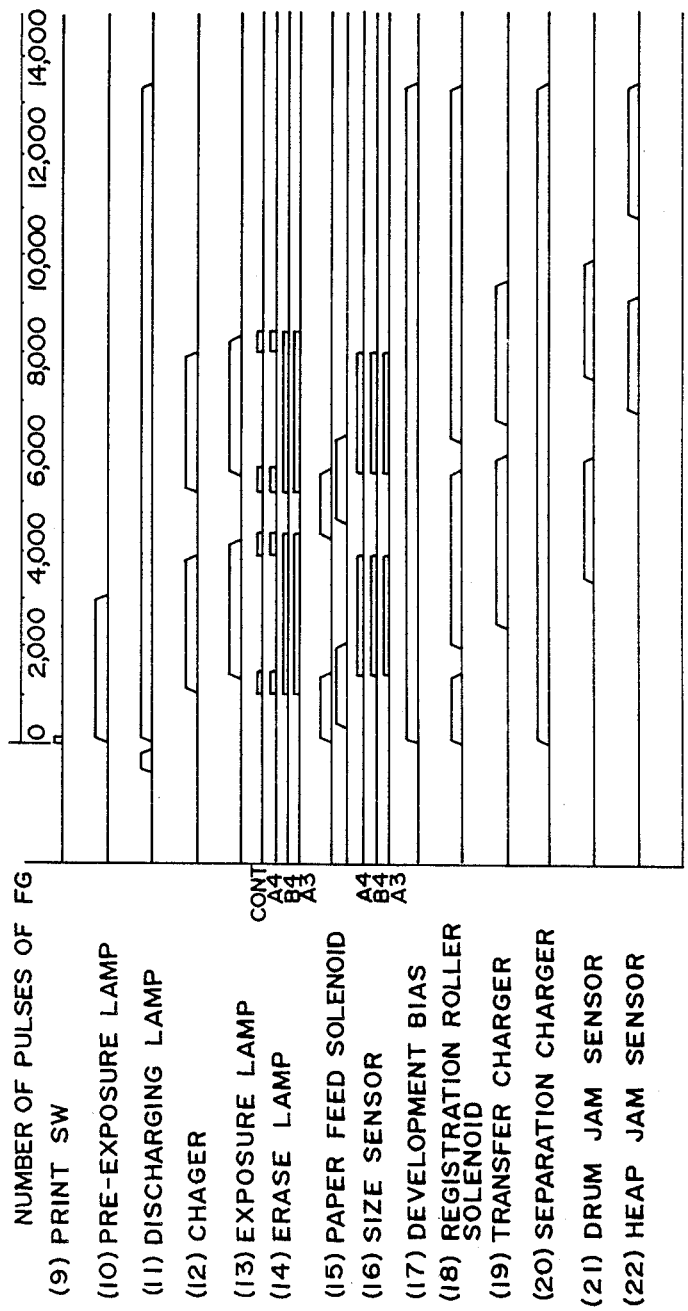

FIGS. 12A and 12B are timing charts showing the control function of the copier in a same-size copying operation, wherein the FG pulses are timing pulses generated by the frequency generator FG attached on the shaft of the main motor. Approximately 200 pulses are generated per turn of the main motor. The details of the control function will not be explained further.

Figure 13:
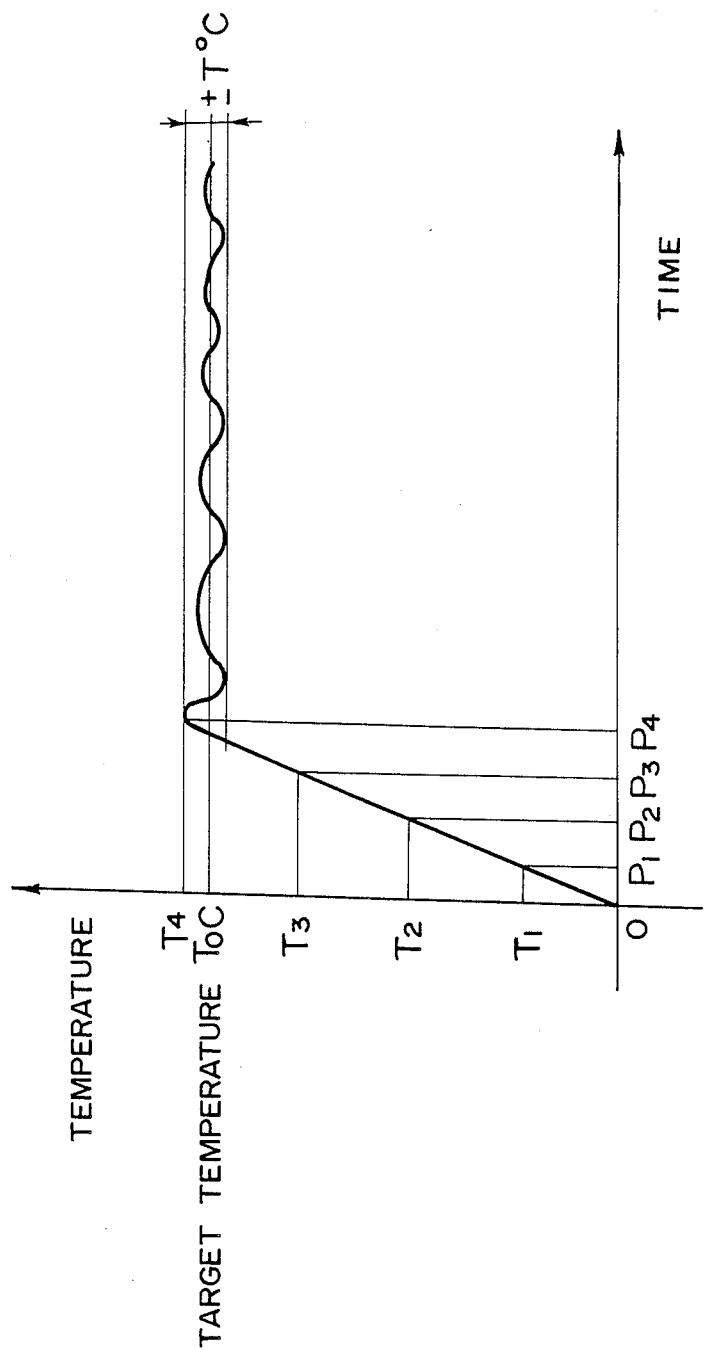
FIG. 13 is a chart showing the behavior of temperature control.

Though the foregoing explanation has been limited to the sequence timing control and the motor servo control, the same principle can be applied to other automatic control systems such as those for temperature and lamp control. FIG. 13 shows the behavior of temperature control. In FIG. 13, $\Delta T/\Delta P$ is set in the register of the microcontroller MC shown in FIG. 6 or FIG. 11 at the initial period, and the data are set in the order of T1/P1→T2/P2→T3/P3→T4/P4 to reach the target temperature.

Then, in the constant temperature control phase, a control range of $\pm T°$ C. is set in the register of the microcontroller MC, and an interruption signal is given to the CPU only when said control range is exceeded. Consequently the CPU can exclusively perform other task, and the use of a microcontroller MC enables a multi-task processing.

Although the present invention has been explained by an embodiment applied to a copier, but it is not limited to such embodiment and is applicable to any electronic apparatus, for example for temperature control of a display device or for control of robotics.

What is claimed is:

1. An electric load drive control apparatus comprising:
   an electric load;
   drive means for driving said load;
   control means for controlling said drive means by means of hardware;
   a central processing unit for executing programs for controlling said control means and processing a task different from the control of said control means, said central processing unit providing control data for controlling said drive means to said control means before starting of control of said drive means by said control means; and
   detecting means for detecting a drive condition of said load;
   wherein said control means controls said drive means, independently of said central processing unit, in response to the operation of said detecting means so that the drive direction of said load is regulated in a desired manner corresponding to the control data, and
   wherein said control means produce a signal for requesting said central processing unit to control said control means when said detecting means detects that the drive condition of said load departs from a control range corresponding to the control data, and controls said drive means on the basis of new control data transmitted from said central processing unit in response to the signal produced by said control means.

2. An apparatus according to claim 1, wherein said central processing unit interrupts an executing program and controls said control means when said unit receives the control request signal.

3. An apparatus according to claim 2, wherein said central processing unit has an interrupt port for receiving the control request signal.

4. An apparatus according to claim 1, wherein said central processing unit and said control means are integrally constituted.

5. An apparatus according to claim 1, wherein said load is a motor.

6. An apparatus according to claim 5, wherein said motor drives a reciprocating member for image formation.

7. An apparatus according to claim 5, wherein said motor drives a rotating member for image formation.

8. An apparatus according to claim 5, wherein said detecting means detects a driving speed of said motor.

9. An apparatus according to claim 1, wherein said central processing unit provides data associated with a control range of said drive means to said control means.

10. An apparatus according to claim 1, wherein said load is a heat emitting device and said control means controls said drive means to regulate the temperature.

11. An apparatus according to claim 1, wherein said central processing unit interrupts control of said control means and processes the task while the drive condition is regulated in the desired condition.

* * * * *

UNITED STATES PATENT AND TRADEMARK OFFICE
CERTIFICATE OF CORRECTION

PATENT NO. : 4,882,778             Page 1 of 3
DATED : November 21, 1989
INVENTOR(S) : Masao Hosaka, et al.

It is certified that error appears in the above-identified patent and that said Letters Patent is hereby corrected as shown below:

On the title page:

[56]  References Cited:

"Revt et al." should read --Reut et al.-- and
"4,491,004 1/1985 Horiuchi et al." should read
--4,491,904 1/1985 Horiuchi et al.--.

Figure 10B:
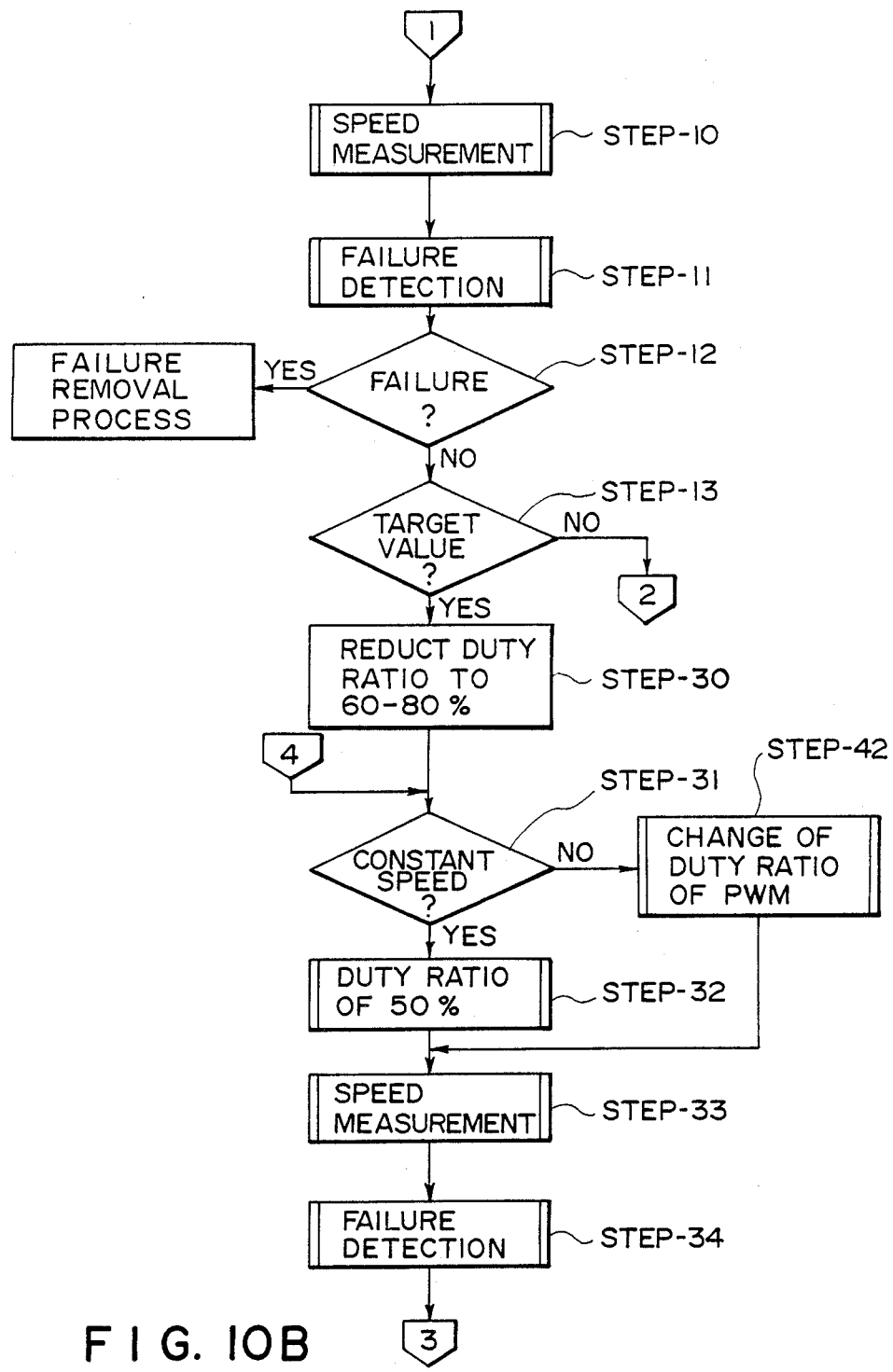
Figure 10C:
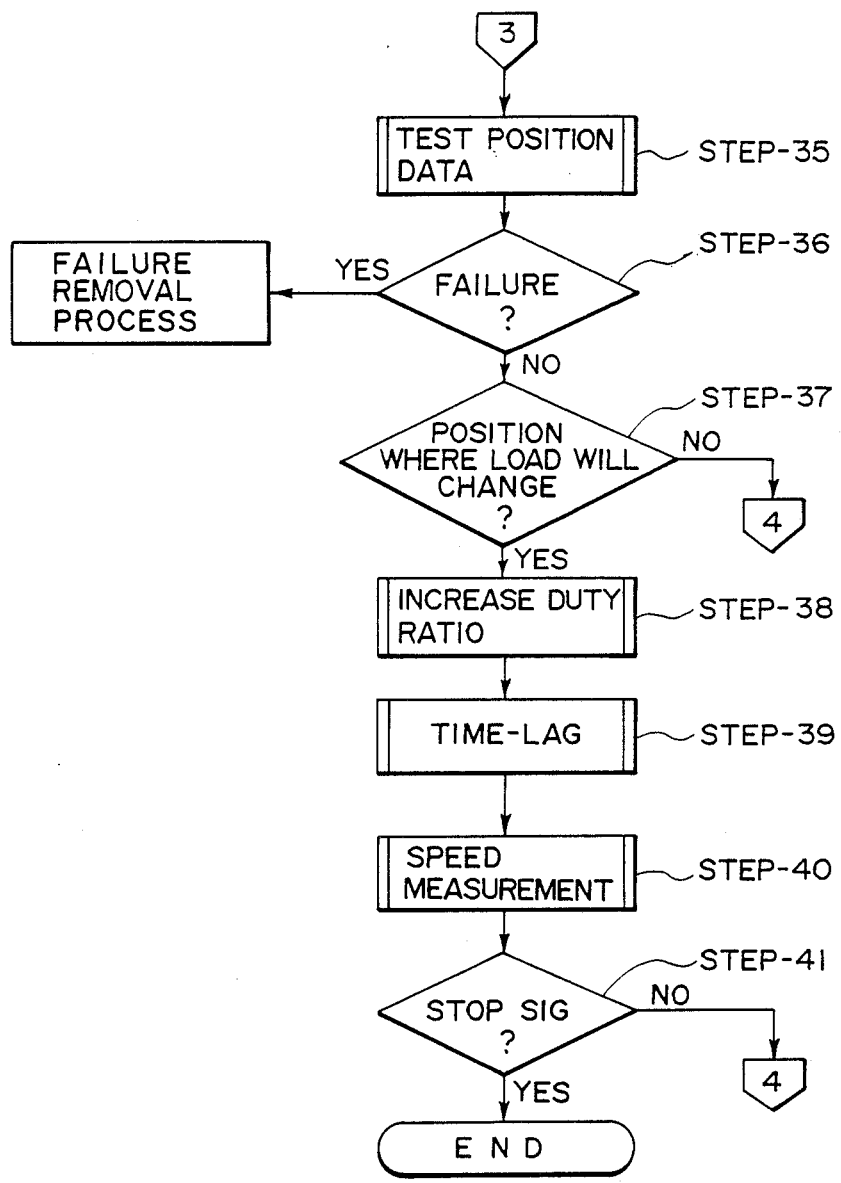

SHEET 10:

Figure 10B, "REDUCT" should read --REDUCE--.

SHEET 16:

Figure 12B, "CHAGER" should read --CHARGER--.

COLUMN 1:

Line 5, "continuation-in-part" should read
--continuation--.

Line 15, "apparatus such as copier," should read
--apparatuses such as copiers,--.

UNITED STATES PATENT AND TRADEMARK OFFICE
CERTIFICATE OF CORRECTION

PATENT NO. : 4,882,778
DATED : November 21, 1989
INVENTOR(S) : Masao Hosaka, et al.

It is certified that error appears in the above-identified patent and that said Letters Patent is hereby corrected as shown below:

COLUMN 3:

Line 24-39, close up left margin.

COLUMN 5:

Line 20, "chopping" should read --chopping process;--.

Line 25, "is" should be deleted.

COLUMN 6:

Line 8, "is in" should read --is not contained in--.

COLUMN 7:

Line 16, "FG-by" should read --FG by--.

Line 38, "FG The" should read --FG. The--.

UNITED STATES PATENT AND TRADEMARK OFFICE
CERTIFICATE OF CORRECTION

PATENT NO. : 4,882,778                     Page 3 of 3

DATED : November 21, 1989

INVENTOR(S) : Masao Hosaka, et al.

It is certified that error appears in the above-identified patent and that said Letters Patent is hereby corrected as shown below:

COLUMN 9:

Line 9, "where" should read --where there--.

COLUMN 10:

Line 33, "nected" should read --necting--.

Line 61, "high-(voltage" should read --high-voltage--.

COLUMN 12:

Line 9, "produce" should read --produces--.

Signed and Sealed this

Thirteenth Day of August, 1991

Attest:

HARRY F. MANBECK, JR.

*Attesting Officer*     *Commissioner of Patents and Trademarks*